United States Patent [19]

Canclini

[11] Patent Number: 5,717,581

[45] Date of Patent: Feb. 10, 1998

[54] CHARGE PUMP CIRCUIT WITH FEEDBACK CONTROL

[75] Inventor: Athos Canclini, Santa Clara, Calif.

[73] Assignee: SGS-Thomson Microelectronics, Inc., Carrollton, Tex.

[21] Appl. No.: 729,315

[22] Filed: Oct. 15, 1996

Related U.S. Application Data

[63] Continuation of Ser. No. 268,838, Jun. 30, 1994, abandoned.

[51] Int. Cl.[6] .................................................... H02M 3/18
[52] U.S. Cl. ........................ 363/60; 307/110; 327/536
[58] Field of Search .............................. 307/110; 363/61, 363/62, 60; 327/536

[56] References Cited

U.S. PATENT DOCUMENTS

| Re. 35,121 | 12/1995 | Olivo et al. | 363/60 |
|---|---|---|---|
| 4,398,099 | 8/1983 | Benoit-Gonin et al. | 363/60 |
| 4,621,315 | 11/1986 | Vaughn et al. | 363/60 |
| 4,903,189 | 2/1990 | Ngo et al. | 363/127 |
| 4,922,403 | 5/1990 | Feller | 363/60 |
| 5,034,875 | 7/1991 | Hattori | 363/60 |
| 5,051,881 | 9/1991 | Herold | 363/60 |
| 5,095,223 | 3/1992 | Thomas | 307/110 |
| 5,132,895 | 7/1992 | Kase | 363/60 |

FOREIGN PATENT DOCUMENTS

93/14554  7/1993  WIPO .

*Primary Examiner*—Peter S. Wong
*Assistant Examiner*—Shawn Riley
*Attorney, Agent, or Firm*—Theodore E. Galanthay; Lisa K. Jorgenson

[57] ABSTRACT

A charge pump circuit with negative current feed back is disclosed. The charge pump circuit consists of charge pump stages, switch circuits in between the stages, and a feedback loop to control the conductivity of the switch circuit. The conductivity of the switch circuits is controlled by modulating the bias current of the switch circuit which modulates its conductivity. By using the feedback loop to control the conductivity, the output voltage of the charge pump circuit can be regulated.

17 Claims, 3 Drawing Sheets

CHARGE PUMP CIRCUIT WITH FEEDBACK CONTROL

This is a continuation of application Ser. No. 08/268,838, filed Jun. 30, 1994 now abandoned.

BACKGROUND OF THE INVENTION

1. Field of the Invention

This invention relates to improvements in charge pump circuits, and more particularly to improvements in the regulation of the output voltage of a charge pump, and more particularly to using a negative feedback loop to control the switch circuits of a charge pump.

2. Description of the Relevant Art

In many electronics applications, it is desirable to increase the voltage of a power source to a higher voltage. FIG. 1 shows a charge pump 10 which is a typical circuit for tripling the voltage of a power source. The charge pump 10 takes the supply voltage 12 and pumps it up to a pumped voltage (Vp) 14, which is between two and three times the supply voltage 12.

In operation, first plate of capacitor 22 is charged to the voltage source level through diode 16 when the clock signal 26 is high. When clock signal 26 goes low, the output of inverter 28 drives the second plate of capacitor 22 to the voltage source level. Consequently, the voltage on first plate of capacitor 22 is pumped to two times the supply voltage 12 minus the voltage drop across diode 16. At this time, the output to inverter 32 is low so that the second plate of capacitor 24 is at ground. If the voltage on capacitor 24 is less than the doubled voltage on capacitor 22, the charge on capacitor 22 will flow through rectifier 18 on to capacitor 24 charging it to the doubled voltage. On the next clock cycle, the output of inverter 32 goes high which drives the second plate of capacitor 24 to the voltage of the voltage source. Since the voltage on capacitor 24 was two times the voltage on the voltage source 12, the voltage on the first plate of capacitor 24 is now three times (minus voltage drops of the diodes) the voltage of the voltage source 12. For this reason, this charge pump circuit 10 is commonly referred to as a voltage tripler. This tripled voltage is filtered by filter capacitor 34 and filter resistor 36 and is available to a load on line 14.

FIG. 2 shows generally the same charge pump circuit as in FIG. 1, but with diodes 16, 18, and 20 replaced with switch circuits 40, 42, and 44, respectively. The switch circuits 40, 42, and 44 can be configured to turn on at the same time that diodes 16, 18, and 20 would have turned on, respectively, as is known in the art. FIG. 2 shows a timing control circuit 46 connected to the control element of switch circuit 40, 42, and 44 and provides the signals necessary for rectification. Consequently, charge pump circuit 48 operates analogously to charge pump circuit 10 of FIG. 1. However, charge pump circuit 48 is advantageous since the voltage losses across switches 40, 42, and 44 are much lower than their counterpart diodes 16, 18, and 20.

More specifically, voltage source 12 is connected to the input end of switch circuit 40. The output end of switch circuit 40 is connected to the input end of switch circuit 42 and to the positive end of capacitor 22. (The input end and output end of the switch circuits refers to the voltage on the switches when the switches are conducting.) The output end of switch circuit 42 is connected to the input end of switch circuit 44 and the first plate of capacitor 24. A clock signal 26 is connected to the inputs of inverters 28 and 30. The output of inverter 28 is connected to the second plate of capacitor 22 and the output to inverter 30 is connected to the input to inverter 32. The output to inverter 32 is connected to the second plate of capacitor 24. The output end of switch 44 is connected to filter capacitor 34, filter resistor 36, and the output voltage Vp 14.

In operation, the first plate of capacitor 22 is charged to the voltage source level through switch circuit 40 when the clock signal 26 is high. When clock signal 26 goes low, the output of inverter 28 drives the second plate of capacitor 22 to the voltage source level. Consequently, the voltage on first plate of capacitor 22 is pumped to two times the supply voltage 12 minus the voltage drop across switch circuit 40. At this time, the output to inverter 32 is low so that the second plate of capacitor 24 is at ground. If the voltage on capacitor 24 is less than the doubled voltage on capacitor 22, the charge on capacitor 22 will flow through switch circuit 42 on to capacitor 24 charging it to the doubled voltage. On the next clock cycle, the output of inverter 32 goes high which drives the second plate of capacitor 24 to the voltage of the voltage source. Since the voltage on capacitor 24 was two times the voltage on the voltage source 12, the voltage on the first plate of capacitor 24 is now three times the voltage of the voltage source 12 (minus the voltage drops of the switches). The output voltage in FIG. 2 will be higher than the output voltage in FIG. 1 since the voltage drop across a switch circuit is at least 10 times better than the voltage drop across a diode.

It has been observed that many battery powered consumer products have unregulated voltage sources, such as batteries and the like. In these products, it is not uncommon for the voltage source to vary by as much as 40%. For example, a 5 volt battery might not be charged until it is as low as 3 volts. The output of the voltage tripler will fluctuate proportional to the fluctuations in the voltage source. It has also been observed that high input voltages in semiconductors can cause breakdowns in switching transistors and produce latch-up and/or reliability problems. More specifically, some manufacturing process technologies, such as 1.2 micron BiCMOS process, are sensitive to "hot electron" effects which may be caused by voltages such as those present in the charge pump circuit.

If the voltage source varies from 3 to 5 volts, then the tripled voltage will vary from approximately 9 volts to approximately 15 volts, a variation of approximately 6 volts. The tripled voltage of a charge pump may be sufficiently high at 9 volts for its application and yet dangerously high at 15 volts. It is therefore desirable to regulate the output voltage of a voltage tripler to prevent the tripled voltage from exceeding levels which are considered safe for a given technology.

Prior art devices compensated for such variations by clamping the tripled voltage with a zener diode at some level below the perceived danger voltage. The clamping component sinks current during the period of excess voltage to drop the voltage to an acceptable level. The problem with this solution is that it wastes energy by sinking the excess current.

SUMMARY OF THE INVENTION

In light of the above, therefore, it is an object of the invention to provide an improved charge pump circuit.

It is another object of the invention to provide a charge pump circuit with a regulated output voltage.

It is another object of the invention to provide a charge pump circuit with a negative feedback loop to regulate the pumped voltage.

It is another object of the invention to regulate the output of a charge pump circuit by modulating the conductivity of a switch circuit responsive to the output voltage.

It is another object of the invention to provide a charge pump circuit which is not sensitive to hot electrons.

It is another object of the invention to provide a charge pump circuit with increased reliability.

These and other objects, features, and advantages will be apparent to those skilled in the art from the following detailed description when read in conjunction with the accompanying drawings and appended claims.

In accordance with the broad aspect of the invention, a charge pump circuit with negative feedback is presented. The charge pump circuit has a plurality of charge pump stages connected by switch circuits which rectify the current between the stages. The charge pump output voltage is fed back to the switch to modulate its conductivity. The resulting feedback loop regulates the output of the charge pump.

In accordance with another broad aspect of the invention, a bias current circuit with negative feedback is disclosed. The circuit provides a bias current, for a switch circuit, which is inversely proportional to the output of the charge pump.

DETAILED DESCRIPTION OF THE EMBODIMENT

Figure 1:
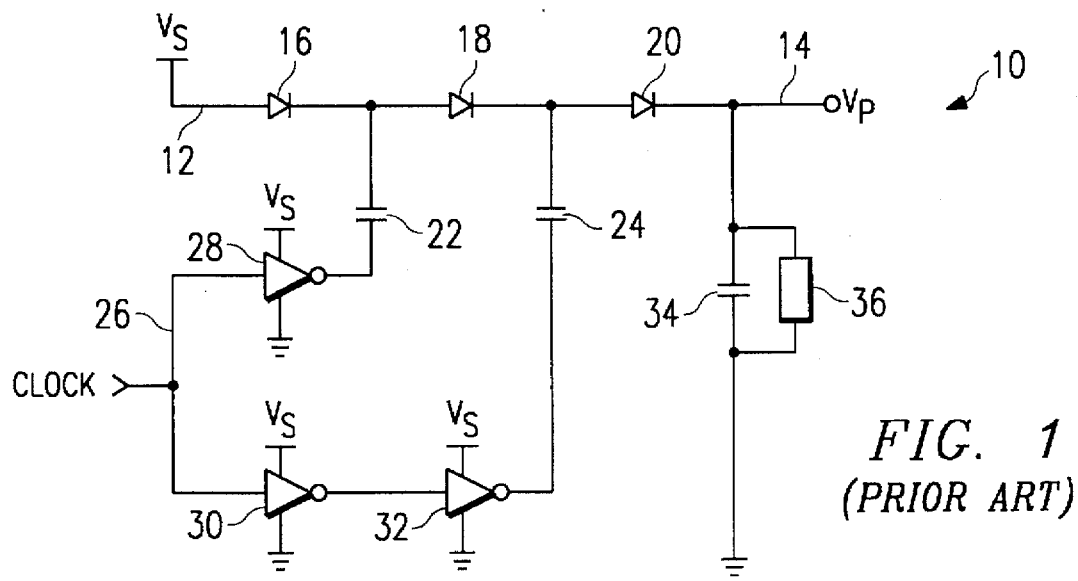
FIG. 1 is a schematic diagram of a typical prior art charge pump circuit.
Figure 2:
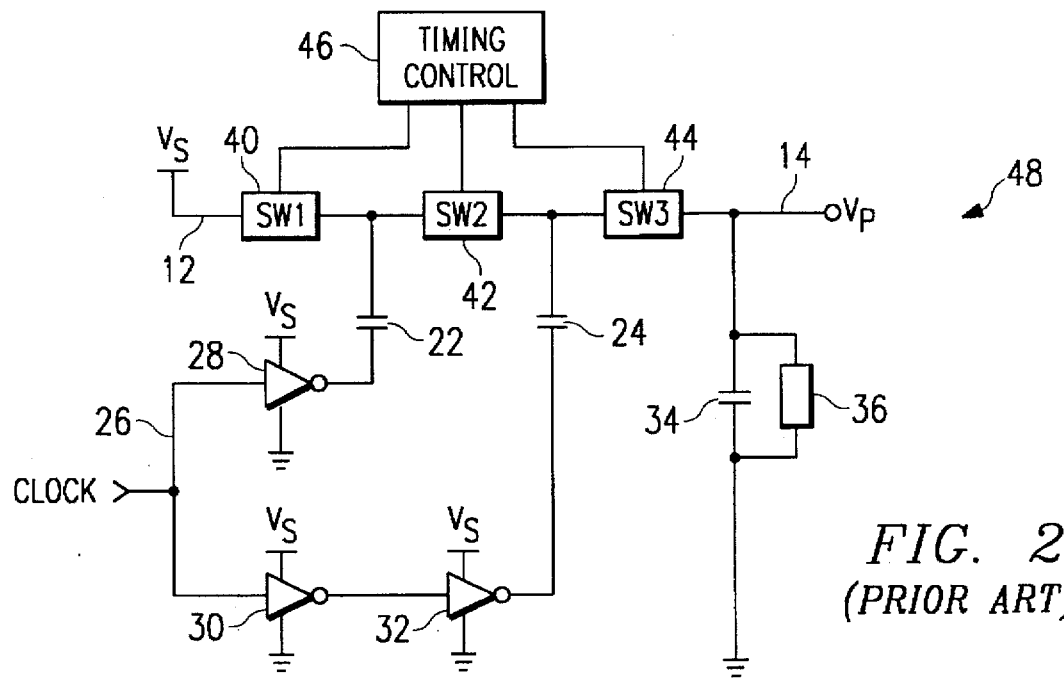
FIG. 2 is a schematic diagram of a prior art charge pump circuit using switches.
Figure 3:
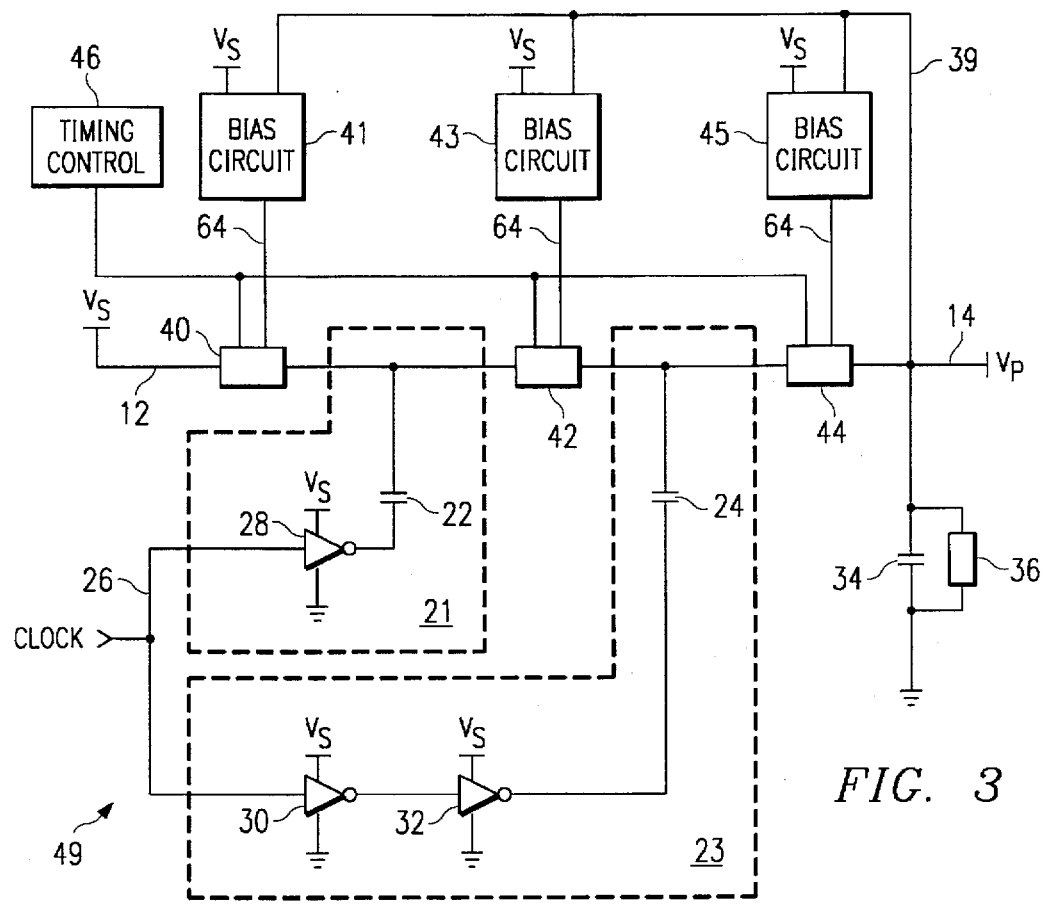
FIG. 3 is a schematic diagram of a charge pump circuit with feedback.

FIG. 3 shows generally the same charge pump circuit as in FIG. 2, but the switch circuits in FIG. 3 are controlled by a feedback loop 39 and bias circuits 41, 43, and 45 as well as timing control circuit 46. Consequently, charge pump circuit 49 operates analogously to charge pump circuit 10 of FIG. 1. However, charge pump circuit 49 is advantageous since the output voltage is regulated using feedback loop 39 and bias circuits 41, 43, and 45.

More specifically, voltage source 12 is connected to the input end of switch circuit 40. The output end of switch circuit 40 is connected to the input end of switch circuit 42 and to the first end of capacitor 22. (The input end and output end of the switch circuits refers to the voltage on the switches when the switches are conducting.) The output end of switch circuit 42 is connected to the input end of switch circuit 44 and the first plate of capacitor 24. A clock signal 26 is connected to the inputs of inverters 28 and 30. The output of inverter 28 is connected to the second plate of capacitor 22 and the output to inverter 30 is connected to the input to inverter 32. The output to inverter 32 is connected to the second plate of capacitor 24. The output end of switch 44 is connected to filter capacitor 34, filter resistor 36, and the output voltage Vp 14. The output voltage 14 is fed back through feedback loop 39 to bias circuit 41, 43, and 45. Bias circuit 41, 43, and 45 are connected to the bias signal 64 of the switch circuits 40, 42, and 44, respectively.

In operation, the first plate of capacitor 22 is charged to the voltage source level through switch circuit 40 when the clock signal 26 is high. When clock signal 26 goes low, the output of inverter 28 drives the second plate of capacitor 22 to the voltage source level. Consequently, the voltage on first plate of capacitor 22 is pumped to two times the supply voltage 12 minus the voltage drop across switch circuit 40. At this time, the output to inverter 32 is low so that the second plate of capacitor 24 is at ground. If the voltage on capacitor 24 is less than the doubled voltage on capacitor 22, the charge on capacitor 22 will flow through switch circuit 42 on to capacitor 24 charging it to the doubled voltage. On the next clock cycle, the output of inverter 32 goes high which drives the second plate of capacitor 24 to the voltage of the voltage source. Since the voltage on capacitor 24 was two times the voltage on the voltage source 12, the voltage on the first plate of capacitor 24 is now three times the voltage of the voltage source 12 (minus the voltage drops of the switches).

According to the preferred embodiment of the invention, the output voltage 14 is fed back to bias circuits 41, 43, and 45 which modulate the conductivity of their respective switch circuit responsive to the output voltage 14. If the output voltage 14 is high, relative to a desired voltage, the bias circuits 41, 43, and 45 decrease the bias signal 64 to their respective switch circuits thereby decreasing the conductivity of the switch circuits 40, 42, and 44. Conversely, if the output voltage is low relative to a desired voltage, the bias circuits 41, 43, and 45 increase the bias current 64 to their respective switch circuits thereby increasing the conductivity of the switch circuits 40, 42, and 44. Consequently, the output voltage 14 is regulated at the desired voltage.

FIG. 3 shows a two stage charge pump where the first stage 21 is comprised of clock 26, inverter 28, and capacitor 22 and doubles the voltage from the voltage source 12 to a doubled voltage and where the second stage 23 is comprised of clock 26, inverter 30, inverter 32, and capacitor 24. The first stage doubles the voltage from the voltage source voltage Vs 12 while the second stage adds another Vs voltage to the doubled voltage thereby tripling the voltage source voltage Vs 12. Even though FIG. 3 only has two stages, it is understood that the invention will operate with any number of stages.

Figure 4:
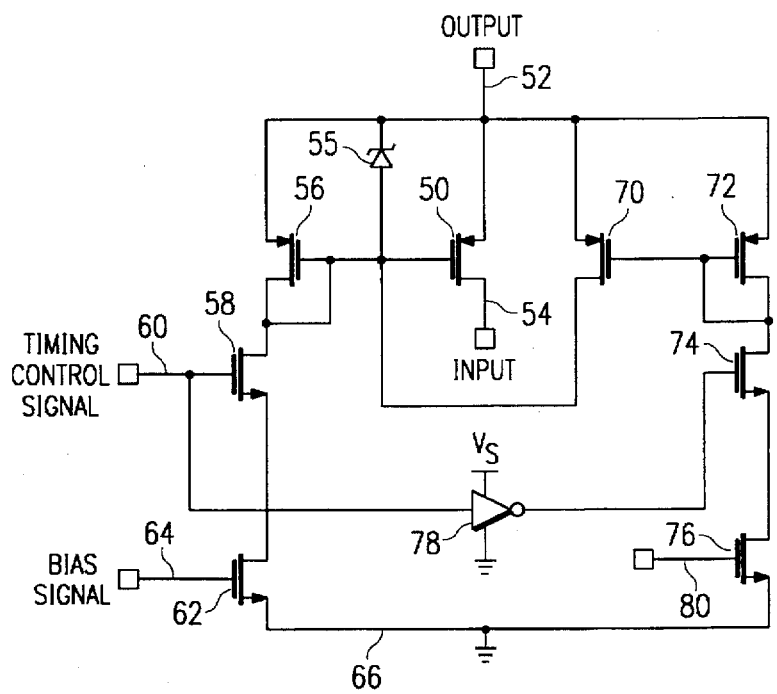
FIG. 4 is a schematic diagram of the preferred embodiment of a charge pump switch circuit.

FIG. 4 shows the preferred embodiment of a switch circuit 40, 42, and 44 of FIG. 3. Generally, current flows from input 52 to output 54 responsive to the voltage on the control node 60 and the bias current node 64, as shown in FIG. 3. More specifically, the circuit has a p-channel transistor 50 with a source connected to an output 52, a drain connected to a input 54. The gate of transistor 50 is connected to the gate and drain of p-channel transistor 56. The source of transistor 56 is connected to the source of transistor 50. The drain and gate of transistor 56 and the gate of transistor 50 are connected to the drain of n-channel transistor 58. The gate of transistor 58 is connected to a timing control signal 60. The source of transistor 58 is connected to the drain of n-channel transistor 62. The gate of transistor 62 is connected to a bias signal 64 and the drain of transistor 62 is connected to a voltage reference 66. The turn-off circuit consists transistors 70, 72, 74, and 76 and of an inverter 78. The source of p-channel transistor 70 is connected to the source of transistor 50 and the drain of transistor 70 is connected to the gate of transistors 50 and 56. The gate of transistor 70 is connected to the gate and drain of p-channel transistor 72 and the drain of n-channel transistor 74. The source of transistor 72 is connected to the source of transistor 50. The input to inverter 78 is connected to the timing control signal and the gate to transistor 58. The output to inverter 78 is connected to the gate of transistor 74. The source of transistor 74 is connected to the drain of n-channel transistor 76. The gate to transistor 76 is connected to a bias signal 80 and the source is connected to a reference voltage 66.

In operation, current is conducted through transistor 50 from input 54 to output 52 when the timing control signal 60 is high. Conversely, current is blocked from conducting through transistor 50 from input 54 to output 52 when the timing control signal 60 is low. More specifically, when the timing control signal 60 is high, transistor 58 turns on. Bias signal 64 keeps transistor 62 on as a constant current source. Therefore, transistor 56 is turned on which forces transistor 50 on, thus allowing current to flow from input 54 to output 52. At this time, the output of inverter 78 is low and thus transistor 74 is off. This state keeps transistors 70 and 72 off. Transistor 58 acts as the switching transistor for the circuit as well as the cascoding transistor which prevents the voltage on the drain of transistor 62 from reaching a high voltage. Conversely, transistor 58 is turned off when the timing control signal 60 is low. This consequently turns off transistor 56. Additionally, the output to inverter 78 is high, transistor 74 is on, and transistors 70 and 74 are conducting. With transistor 70 on, the gate-to-source capacitance of transistor 50 is quickly discharged which facilitates its turn-off. Again, transistor 58 acts as the switching transistor for the circuit as well as the cascoding transistor which prevents the voltage on the drain of transistor 62 from reaching a high voltage. Additionally, transistor 74 acts as a complementary switching transistor for the circuit as well as the cascoding transistor which prevents the voltage on the drain of transistor 76 from reaching a high voltage. This embodiment offers the advantages of providing a reduced voltage drop switch circuit which can withstand high gate to drain voltages and which is not sensitive to hot electrons by transistor 56 limiting the drain to gate voltage of transistor 50 and by transistor 58 limiting the drain-to-gate voltage of transistor 62. Additionally, this embodiment provides a turn-off circuit which facilitates the quick turn-off of transistor 50.

FIG. 4 also shows an optional zener diode 55 connected between the sources and the gate of transistors 50 and 56. In operation, the zener diode 55 offers the additional gate-to-source breakdown voltage protection. More specifically, the drain and source of transistor 50 may reach high voltages such as more than 15 volts. During such high voltages, it may be desirable to clamp the gate-to-source voltage to the breakdown voltage of the zener diode 82, such as at 5.6 volts. The zener diode 56 insures that the transistors 50 and 56 are never exposed to excessive voltage which increases the reliability of the circuit.

Figure 5:
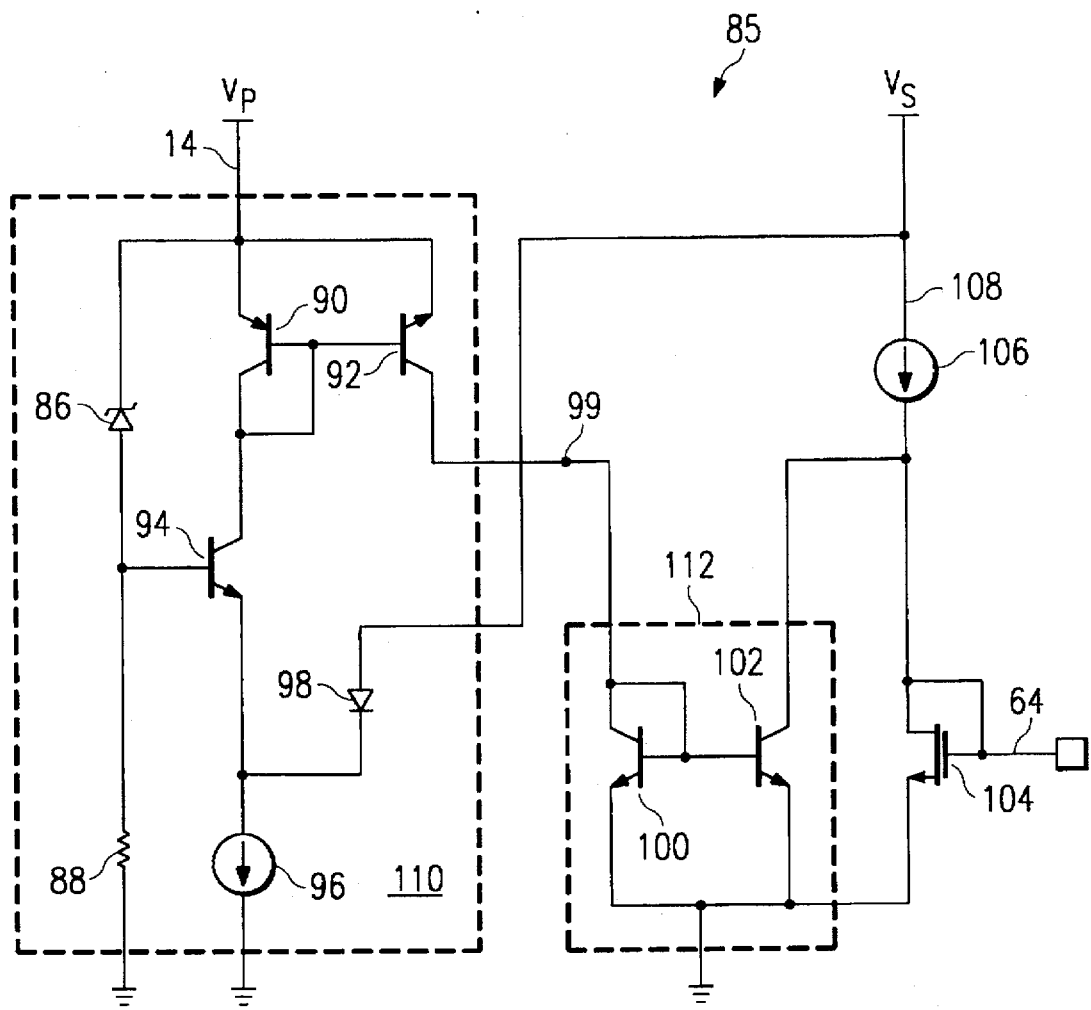
FIG. 5 is a schematic diagram of the preferred embodiment a bias current circuit.

The switch circuit described in FIG. 4 show a bias current 64 connected to the gate of transistor 62. The bias signal 64 is typically designed to provide the bias necessary for transistor 62 to act as a 10 microamp current source. FIG. 5 shows the preferred embodiment of the bias current circuit 85 for generating the bias signal 64 which provides the bias necessary for transistor 62 to act as a 10 microamp current source and also provides negative feedback to the switch circuit to decrease the conductivity of the switch circuit when the pumped voltage exceeds a safe level.

FIG. 5 shows the preferred embodiment of the bias circuits 41, 43, and 45 of FIG. 3. Generally, the bias current circuit 85 receives the charge pump output voltage 14 (Vp) and generates a bias current 64 inversely proportional to Vp. This occurs since the output voltage Vp 14 is amplified by amplifier 110 into a current. The current is then inverted by a current mirror 112 and subtracted from the current supplied by the constant current source 106. Consequently, bias signal 64 is the current provide by constant current source 106 minus the inverted current of the amplifier 110. The bias signal 64 is typically designed to provide the bias necessary for transistor 62 of FIG. 4 to act as a 10 microamp current source when the switch requires full conductivity and less than 10 microamps as necessary to provide negative feedback to the switch circuit when the pumped voltage exceeds a safe level.

More specifically, the pumped voltage (Vp) 14 is connected to the bias current circuit 85 through the cathode of zener diode 84, the emitter of pnp bipolar transistor 90, and the emitter of pnp-bipolar transistor 92. The anode of zener diode 86 is connected to resistor 88 and to the base of npn bipolar transistor 94. The other end of resistor 88 is connected to ground. The base of transistor 90 is connected to its collector, the collector of transistor 94 and to the base of transistor 92. The emitter of transistor 94 is connected to a current source and to the cathode of diode 98. The other end of current source 96 is connected to a reference voltage. The collector of transistor 92 is connected to the collector and base of transistor 102 and the base of transistor 102. The emitters of npn bipolar transistors 100 and 102 and the source of n-channel transistor 104 are connected to ground. The collector of transistor 102 is connected to the gate and drain of transistor 104 and to the source of current source 106. The anode of diode 98 and the drain of current source 106 are connected to the voltage source 108 (Vs).

In operation, the bias current circuit 85 regulates the output voltage 14 (Vp) by providing a bias current which is inversely proportional to the output voltage 14. More specifically, the output voltage 14 is converted into a current by the amplifier 110 where the base of transistor 94 is pulled to ground by anti-leakage resistor 88 when:

$Vp-Vs<Vz+Vbe$

Where:
Vp=pumped voltage
Vs=supply voltage
Vz=zener diode voltage
Vbe=base to emitter turn-on voltage When the base is not pulled to ground, current flows in transistor 94, driven by the zener in the conducting state. The current flow of transistor 94 is mirrored by the current mirror set up by transistors 90 and 92. Therefore the output of the amplifier is the current at node 99. The current at node 99 is inverted by the current mirror 112 which is formed with npn bipolar transistors 100 and 102. The mirrored current of transistor 102 is subtracted from the current provided by fixed current source 106 which is feeding the bias signal 64. As the bias current 64 is decreased, the voltage drop across the switch circuit of FIG. 4 is increased which decreases the output of the charge pump circuit, thereby completing the negative feedback loop.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The transistors in the drawings can be any transistor commonly used such as bipolar transistors or field effect transistors.

It should be noted that the circuit of the invention can be integrated on a single integrated circuit. Thus, the present invention provides significant cost and reliability advantages over prior approaches.

I claim:

1. A method of regulating the output voltage in a charge pump circuit comprising the steps of:
   charging a first capacitor to a voltage;
   periodically pumping said first capacitor to a higher voltage;
   periodically conducting current through a first switch circuit from said first capacitor to a second capacitor which is operatively connected, through zero or more additional pumping stages which each comprise an additional switching circuit and an additional capacitor, to provide a pumped output voltage; and
   modulating the on-state conductivity of said switch circuit responsive to said pumped output voltage.

2. The method of claim 1 wherein the step of modulating the conductivity further comprises the steps of feeding back the output voltage to a current bias circuit and modulating a bias voltage so that the on-state conductivity of said switch circuit is modulated responsive to the output voltage.

3. The method of claim 2 wherein the step of feeding back comprises negative feedback.

4. The method of claim 1 wherein the step of modulating the current further comprises the steps of:
   sensing the output voltage of the charge pump circuit;
   reducing the conductivity of the switch circuit as the output voltage rises above a desired voltage; and
   increasing the conductivity of the switch circuit as the output voltage falls below a desired voltage.

5. The method of claim 3 wherein the step of reducing the conductivity of a switch circuit comprises reducing a bias current to the switch circuit.

6. A bias current circuit for modulating the conductivity of a switch circuit in a charge pump comprising:
   an amplifier having an input for receiving a output voltage, and having an output;
   a constant current source having an output connected to a switch circuit for providing a bias current to said switch circuit; and
   a current source having a control element connected to the output of said amplifier and having a current draining element connected to the output of said constant current source for modulating the bias current of said switch circuit responsive to the output voltage;
   wherein the amplifier comprises:
      a zener diode having a cathode for receiving an output voltage and having an anode;
      a npn bipolar transistor having a base connected to the anode of said zener diode, having a collector and an emitter;
      a current source having a drain connected to the emitter of said npn bipolar transistor and having a source connected to a reference voltage; and
      a first current mirror having a current path connected between the output voltage and the collector of said npn bipolar transistor and having an output so that the output current is proportional to the output voltage.

7. The circuit of claim 6 wherein the first current mirror further comprises:
   a first pnp bipolar transistor having an emitter connected to the output voltage and having a gate and collector connected to said npn bipolar transistor; and
   a second pnp bipolar transistor having an emitter connected to the output voltage, having a base connected to the base of said first pnp bipolar transistor and having a collector for outputting the current of the amplifier.

8. The circuit of claim 6 wherein said current source further comprises:
   a n-channel transistor having a drain connected to the source of said constant current source, having a source connected to a voltage reference, and having a gate connected to the source of said constant current source; and
   a second current mirror having a first current path connected between the output of said amplifier and a voltage reference, and having mirrored current path connected between the source of said constant current source and a reference voltage, for decreasing the bias current to the switching circuit responsive to the output of said amplifier.

9. The circuit of claim 8 wherein the second current mirror comprises:
   a first npn bipolar transistor having a collector and a gate connected to the output of said amplifier and having an emitter connected to ground; and
   a second npn bipolar transistor having an emitter connected to ground, having a gate connected to the gate of said first npn-bipolar transistor, and having a collector connected to the source constant current source.

10. A circuit for rectifying current in a charge pump comprising:
    a switch circuit having a current path between a first charge pump stage and a second charge pump stage and having a current bias element for receiving a bias current; and
    a bias circuit connected to the current bias element of said switch circuit for modulating the conductivity of said switch circuit, responsive to an output to said charge pump;
    wherein the amplifier comprises:
       a zener diode having a cathode for receiving a pumped voltage and having an anode;
       a npn bipolar transistor having a base connected to the anode of said zener diode, having a collector and an emitter;
       a current source having a drain connected to the emitter of said npn bipolar transistor and having a source connected to a reference voltage; and
       a first current mirror having a current path connected between the output voltage and the collector of said npn bipolar transistor and having an output so that the current output is proportional to the output voltage;
    wherein the first current mirror further comprises:
       a first pnp bipolar transistor having an emitter connected to the output voltage and having a gate and collector connected to said npn bipolar transistor; and
       a second pnp bipolar transistor having an emitter connected to the output voltage, having a base connected to the base of said first pnp bipolar transistor and having a collector for outputing the current of the amplifier.

11. A circuit for rectifying current in a charge pump comprising:
    a switch circuit having a current path between a first charge pump stage and a second charge pump stage and having a current bias element for receiving a bias current; and
    a bias circuit connected to the current bias element of said switch circuit for modulating the conductivity of said switch circuit, responsive to an output to said charge pump;

an amplifier having an input connected to the output voltage, and having an output;

a constant current source having an output connected to the current bias element of said switch circuit for providing a bias current to said switch circuit; and a current source having a control element connected to the output of said amplifier and having a current draining element connected to the output of said constant current source for modulating the bias current of said switch circuit responsive to the output voltage;

wherein said current source further comprises:

a n-channel transistor having a drain connected to the source of said constant current source, having a source connected to a voltage reference, and having a gate connected to the source of said current source, and a second current mirror having a first current path connected between the output of said amplifier and a voltage reference, and having mirrored current path connected between the source of said constant current source and a reference voltage, for decreasing the bias current to the switching circuit responsive to the output of said amplifier.

12. A charge pump circuit comprising:

a plurality of charge pump stages;

a plurality of switch circuits, each connected to provide a respective current path, between two of said charge pump stages, whose magnitude is determined by a bias current received at a bias current terminal; and a plurality of bias circuits connected to the current bias elements of said switch circuit for modulating the on-state conductivity of said switch circuits, responsive to an output of said charge pump circuit, said bias circuits each comprising:

an amplifier having an input connected to the output voltage, and having an output;

a constant current source having an output connected to the current bias element of said switch circuit for providing a bias current to said switch circuit; and a current source having a control element connected to the output of said amplifier and having a current draining element connected to the output of said constant current source for modulating the bias current of said switch circuit responsive to the output voltage.

13. A charge pump circuit comprising:

a plurality of charge pump stages;

a plurality of switch circuits having a current path between charge pump stages and having current bias elements for receiving a bias current; and a plurality of bias circuits connected to the current bias elements of said switch circuit for modulating the conductivity of said switch circuits, responsive to an output of said charge pump circuit;

wherein the amplifier comprises:

a zener diode having a cathode for receiving a pumped voltage and having an anode;

a npn bipolar transistor having a base connected to the anode of said zener diode, having a collector and an emitter;

a current source having a drain connected to the emitter of said npn bipolar transistor and having a source connected to a reference voltage; and a first current mirror having a current path connected between the output voltage and the collector of said npn bipolar transistor and having an output so that the current output is proportional to the output voltage.

14. The circuit of claim 13 wherein the first current mirror further comprises:

a first pnp bipolar transistor having an emitter connected to the output voltage and having a gate and collector connected to said npn bipolar transistor; and a second pnp bipolar transistor having an emitter connected to the output voltage, having a base connected to the base of said first pnp bipolar transistor and having a collector for outputing the current of the amplifier.

15. A charge pump circuit comprising:

a plurality of charge pump stages;

a plurality of switch circuits having a current path between charge pump stages and having current bias elements for receiving a bias current; and a plurality of bias circuits connected to the current bias elements of said switch circuit for modulating the conductivity of said switch circuits, responsive to an output of said charge pump circuit;

an amplifier having an input connected to the output voltage, and having an output;

a constant current source having an output connected to the current bias element of said switch circuit for providing a bias current to said switch circuit; and a current source having a control element connected to the output of said amplifier and having a current draining element connected to the output of said constant current source for modulating the bias current of said switch circuit responsive to the output voltage;

wherein said current source further comprises:

a n-channel transistor having a drain connected to the source of said constant current source, having a source connected to a voltage reference, and having a gate connected to the source of said constant current source; and a second current mirror having a first current path connected between the output of said amplifier and a voltage reference, and having mirrored current path connected between the source of said constant current source and a reference voltage, for decreasing the bias current to the switching circuit responsive to the output of said amplifier.

16. An integrated charge pump circuit, comprising:

a plurality of charge-pumping stages, each comprising an intermediate node, a clocked switching element connected to said intermediate node, a capacitor having a first terminal connected to said intermediate node and a second terminal connected to be driven by a respective clocked drive element; and a bias circuit connected to monitor the voltage of an output connection, and to provide a corresponding bias signal to ones of said switching elements; said ones of said switching elements modulating their on-state conductivity in dependence on said bias signal;

wherein said switching elements are connected in a series chain from an input connection to said output connection.

17. An integrated charge pump circuit, comprising:

a plurality of charge-pumping stages, each comprising an intermediate node, a clocked switching element connected to said intermediate node, a capacitor having a first terminal connected to said intermediate node and a second terminal connected to be driven by a respective clocked drive element; and a bias circuit connected to monitor the voltage of an output connection, and to provide a corresponding bias signal to ones of said switching elements;

wherein said switching elements comprise a series transistor connected between two of said intermediate nodes, and also comprise a current mirror stage which modulates the current passed by said series transistor in the on-state, in dependence on said bias signal.

* * * * *